United States Patent
Park et al.

(10) Patent No.: US 8,521,329 B2
(45) Date of Patent: Aug. 27, 2013

(54) OBSTRUCTION-DETERMINING APPARATUS FOR PREVENTING MOBILE ROBOT FROM BECOMING OBSTRUCTED AND BOUNDARY-ESTIMATION METHOD AND MEDIUM USING THE OBSTRUCTION-DETERMINING APPARATUS

(75) Inventors: Ji-young Park, Yongin-si (KR); Seok-won Bang, Seoul (KR); Eun-Young Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 891 days.

(21) Appl. No.: 11/898,060

(22) Filed: Sep. 7, 2007

(65) Prior Publication Data

US 2008/0084284 A1      Apr. 10, 2008

(30) Foreign Application Priority Data

Oct. 9, 2006      (KR) .................. 10-2006-0098162

(51) Int. Cl.
 *G05B 19/418*      (2006.01)
 *G06F 19/00*      (2006.01)

(52) U.S. Cl.
 USPC ........... 700/258; 700/245; 700/249; 700/319; 700/320

(58) Field of Classification Search
 USPC .................. 700/245, 248, 249; 15/319, 320
 See application file for complete search history.

(56) References Cited

U.S. PATENT DOCUMENTS

| | | | |
|---|---|---|---|
| 4,567,338 A * | 1/1986 | Peche | 218/128 |
| 6,832,406 B1 * | 12/2004 | Boos et al. | 15/302 |
| 7,474,941 B2 * | 1/2009 | Kim et al. | 700/258 |
| 2001/0004719 A1 * | 6/2001 | Sommer | 701/23 |
| 2004/0143930 A1 * | 7/2004 | Haegermarck | 15/358 |
| 2005/0015913 A1 | 1/2005 | Kim et al. | |
| 2005/0021181 A1 * | 1/2005 | Kim et al. | 700/245 |

(Continued)

FOREIGN PATENT DOCUMENTS

| | | |
|---|---|---|
| EP | 1850725 | 5/2010 |
| EP | 2279686 | 2/2011 |

(Continued)

OTHER PUBLICATIONS

KR 2003-0085164 for KIPO English Translation.*

(Continued)

*Primary Examiner* — Ian Jen
(74) *Attorney, Agent, or Firm* — Staas & Halsey LLP

(57) ABSTRACT

An obstruction-determining apparatus for preventing a mobile robot from being obstructed in a niche and a boundary-estimation method and medium using the obstruction-determining apparatus are disclosed. More particularly, an obstruction-determining apparatus which can determine whether a mobile robot is obstructed in a niche, and enable a mobile robot to easily escape from an obstacle if the mobile robot is determined to be obstructed in the niche, and a boundary-estimation method and medium for estimating the boundaries of an obstacle with a niche using the obstruction-determining apparatus. The obstruction-determining apparatus includes a contact module which collides with an obstacle above the mobile robot, a contact-operating module which rotates or moves linearly as a result of the collision between the contact module and the obstacle, and a sensing module which detects the rotation or the linear movement of the contact-operating module and determines whether the mobile robot is obstructed in a niche.

22 Claims, 7 Drawing Sheets

(56) References Cited

U.S. PATENT DOCUMENTS

| | | |
|---|---|---|
| 2005/0235451 A1* | 10/2005 | Yan .................................. 15/319 |
| 2007/0016328 A1 | 1/2007 | Ziegler et al. |
| 2008/0155768 A1 | 7/2008 | Ziegler et al. |
| 2011/0271469 A1 | 11/2011 | Ziegler et al. |
| 2012/0036659 A1 | 2/2012 | Ziegler et al. |

FOREIGN PATENT DOCUMENTS

| | | |
|---|---|---|
| EP | 2289384 | 3/2011 |
| EP | 2298149 | 3/2011 |
| EP | 2145573 | 9/2011 |
| EP | 2149324 | 9/2011 |
| FR | 2857843 | 1/2005 |
| JP | 8-123548 | 5/1996 |
| KR | 10-2000-0002317 | 1/2000 |
| KR | 10-2003-0085164 | 11/2003 |
| KR | 10-2004-0013381 | 2/2004 |
| KR | 10-2004-0013382 | 2/2004 |
| KR | 10-2005-0012117 | 1/2005 |
| KR | 10-2005-0099886 | 10/2005 |
| WO | 2006/089307 | 8/2006 |

OTHER PUBLICATIONS

JP 08/123548 for JPO English Translation.*
Extended European Search Report dated Apr. 27, 2012 issued in corresponding European Patent Application No. 07116921.3.

* cited by examiner

OBSTRUCTION-DETERMINING APPARATUS FOR PREVENTING MOBILE ROBOT FROM BECOMING OBSTRUCTED AND BOUNDARY-ESTIMATION METHOD AND MEDIUM USING THE OBSTRUCTION-DETERMINING APPARATUS

CROSS-REFERENCE TO RELATED APPLICATIONS

This application claims priority benefit from Korean Patent Application No. 10-2006-0098162 filed on Oct. 9, 2006 in the Korean Intellectual Property Office, the disclosure of which is incorporated herein by reference in its entirety.

BACKGROUND

1. Field

Embodiments relate to an obstruction-determining apparatus for preventing a mobile robot from becoming obstructed and a boundary-estimation method and medium using the obstruction-determining apparatus, and more particularly to a obstruction-determining apparatus which can determine whether a mobile robot is obstructed in a niche and enable a mobile robot to easily escape from an obstacle if it is determined that the mobile robot is obstructed in the niche, and a boundary-estimation method and medium for estimating the boundaries of an obstacle with a niche using the obstruction-determining apparatus.

2. Description of the Related Art

In recent years, mobile robots have been widely commercialized not only for industrial purposes but also for domestic and business purposes. As a result, a variety of types of mobile robots such as cleaning robots, guide robots, and security robots have been developed.

Mobile robots perform their functions while autonomously navigating in an indoor environment. Mobile robots can recognize walls or obstacles with the aid of a sensor or with reference to a map input thereto in advance, and can thus effectively travel from place to place while avoiding such obstacles.

Conventionally, a plurality of sensors have been used to detect an obstacle or a step difference, and thus to prevent a mobile robot from colliding with the obstacle or falling over. In this case, however, a mobile robot may not be able to recognize an empty space or a niche under the furniture as an obstacle, which is a problem. The term "niche", as used herein, denotes an empty space between the floor and an object that is placed above the floor.

A mobile robot may be obstructed in a niche when an upper portion of the mobile robot cannot pass through the niche, even if a lower portion of the mobile robot can pass through the niche. In this case, a sensor of the mobile robot does not recognize the niche as an obstacle, and, thus, the mobile robot attempts to keep traveling toward the niche, thereby becoming obstructed in the niche and applying an excessive load to a driving module of the mobile robot. As a result, the driving module of the mobile robot may be severely damaged.

For example, a cleaning robot is likely to be stuck in a niche under furniture near the wall while performing a wall-following function.

Once a mobile robot is stuck in a niche, a user must pull the mobile robot out from the niche or drive the mobile robot to escape from the niche through manual manipulation.

SUMMARY

In an aspect of embodiments, there is provided an obstruction-determining apparatus which can determine whether a mobile robot is obstructed in a niche and which can enable a mobile robot to easily escape from an obstacle if the mobile robot is determined to be obstructed in the niche.

In an aspect of embodiments, there is provided a boundary-estimation method which can enable a mobile robot to avoid an obstacle with a niche by estimating the boundaries of the obstacle.

According to an aspect of embodiments, there is provided an obstruction-determining apparatus which is mounted on a mobile robot and determines whether the mobile robot is obstructed. The obstruction-determining apparatus includes a contact module which collides with an obstacle above the mobile robot; a contact-operating module which rotates or moves linearly as a result of the collision between the contact module and the obstacle; and a sensing module which detects the rotation or the linear movement of the contact-operating module and determines whether the mobile robot is obstructed in a niche.

According to another aspect of embodiments, there is provided a mobile robot. The mobile robot includes a main body, a obstruction-determining module which determines whether the main body is obstructed in a niche, and a driving control module which controls movement of the main body if the main body is determined to be obstructed in a niche, wherein the obstruction-determining module collides with an obstacle above the mobile robot, rotates or moves linearly as a result of the collision between the obstruction-determining module and the obstacle, and determines whether the mobile robot is obstructed in a niche by detecting the rotation or the linear movement.

According to another aspect of embodiments, there is provided a boundary-estimation method using an obstruction-determining apparatus. The boundary-estimation method includes allowing a first obstruction-determining module of a plurality of obstruction-determining modules to determine that a mobile robot is obstructed in a niche, the obstruction-determining modules being mounted on the mobile robot, rotating the mobile robot until a second obstruction-determining module of the obstruction-determining modules also determines that the mobile robot is obstructed in the niche, and estimating a boundary of the obstacle based on a plurality of obstructed positions of the mobile robot respectively detected by the obstruction-determining modules.

According to another aspect of embodiments, there is provided an obstruction-determining apparatus which is mounted on a mobile robot and determines whether the mobile robot is obstructed, the obstruction-determining apparatus including a contact-operating module to rotate or to move linearly as a result of a collision above the mobile robot between the obstruction-determining apparatus and the obstacle; and a sensing module to detect the rotation or the linear movement of the obstruction-determining apparatus and to determine whether the mobile robot is obstructed in a niche.

According to another aspect of embodiments, there is provided at least one computer readable medium storing computer readable instructions to implement methods of embodiments.

BRIEF DESCRIPTION OF THE DRAWINGS

These and/or other aspects, features, and advantages will become apparent and more readily appreciated from the following description of exemplary embodiments, taken in conjunction with the accompanying drawings of which.

DETAILED DESCRIPTION OF EMBODIMENTS

Figure 1:
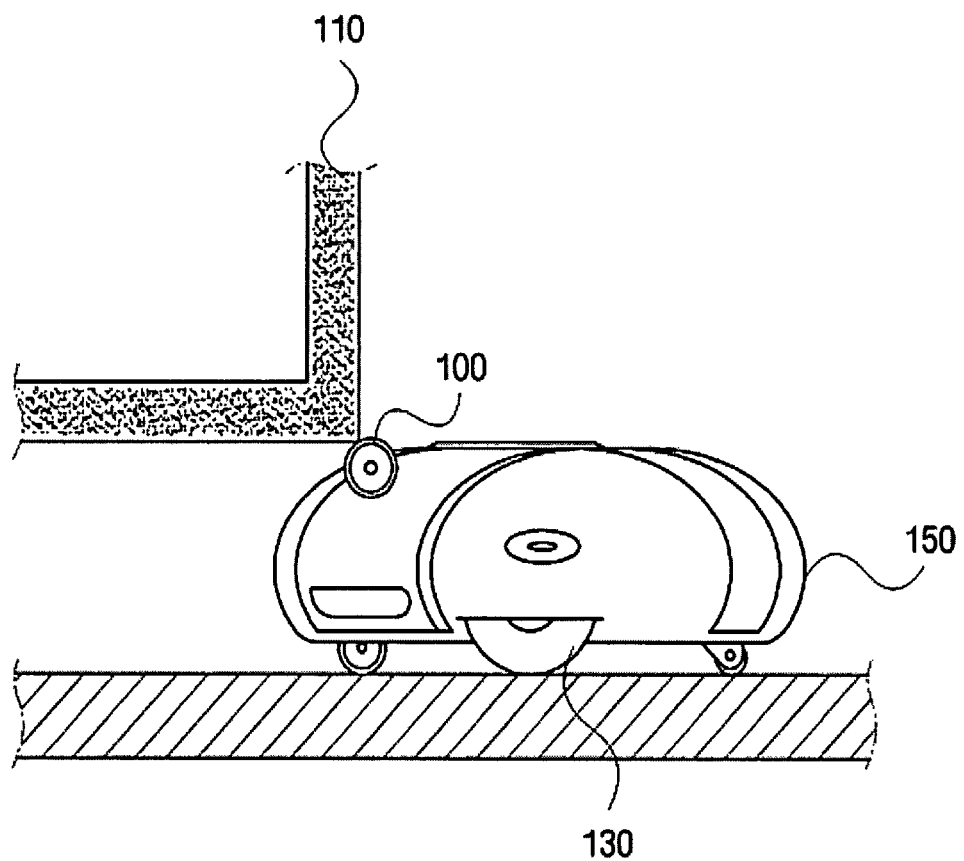
FIG. 1 is a diagram illustrating a mobile robot equipped with an obstruction-determining apparatus according to an exemplary embodiment.

Reference will now be made in detail to exemplary embodiments, examples of which are illustrated in the accompanying drawings, wherein like reference numerals refer to the like elements throughout. Exemplary embodiments are described below by referring to the figures.

FIG. 1 is a diagram illustrating a mobile robot equipped with an obstruction-determining apparatus 100 according to an exemplary embodiment. Referring to FIG. 1, the obstruction-determining apparatus 100 may be mounted on top of a mobile robot 150. The mobile robot 150 may properly detect and avoid an obstacle 110 if the obstacle 110 does not have any niche like a wall. However, the obstacle 110 has a niche at the bottom. Thus, the mobile robot 150 may mistakenly determine that no obstacle exists in its heading, and then keep moving in its heading. Then, an upper portion of the mobile robot 150 may collide with a corner of the obstacle 110 and get stuck in the niche.

The obstruction-determining apparatus 100 prevents the mobile robot 150 from becoming obstructed in the niche 110, and determines whether the mobile robot 150 is stuck in the niche 110. The obstruction-determining apparatus 100 may be mounted on top of the mobile robot 150, as illustrated in FIG. 1. In this case, the obstruction-determining apparatus 100 can prevent the mobile robot 150 from being completely stuck in the niche 110 even if the mobile robot 150 collides with the obstacle 110.

Figure 2A:
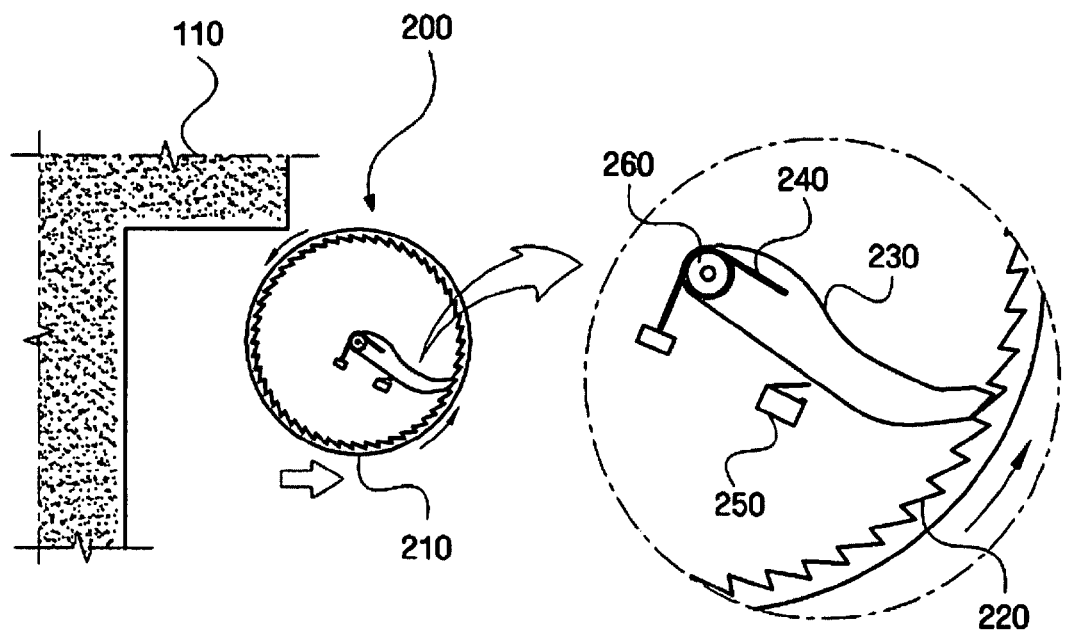
FIGS. 2A and 2B are diagrams illustrating an obstruction-determining apparatus according to another exemplary embodiment.
Figure 2B:
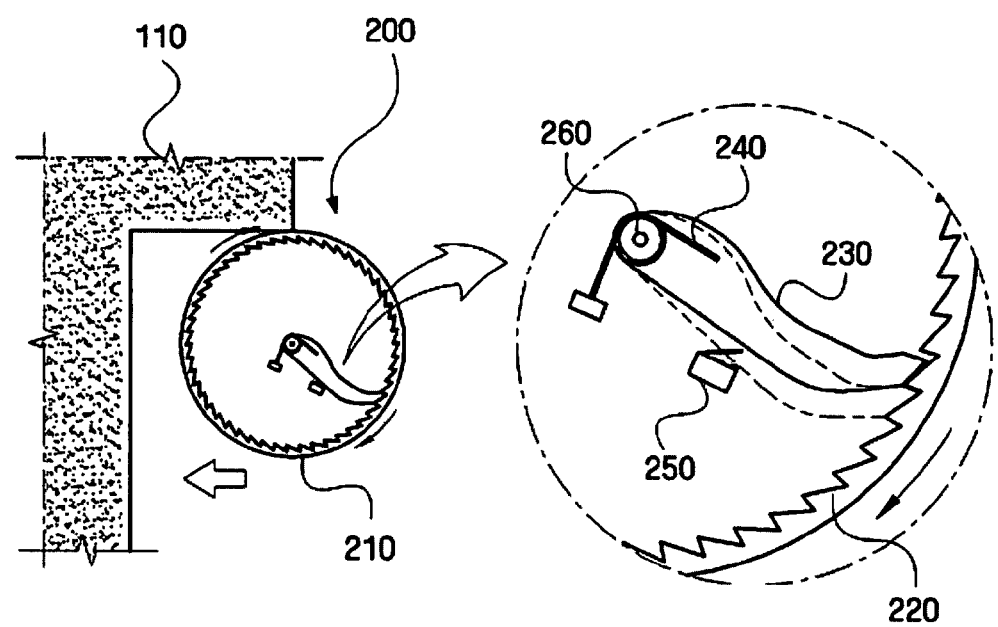

FIGS. 2A and 2B are diagrams illustrating an obstruction-determining apparatus 200 according to an exemplary embodiment. Referring to FIGS. 2A and 2B, the obstruction-determining apparatus 200 includes a contact module 210, a contact-operating module 230, and a sensing module 250.

The contact module 210 may contact an obstacle 110 which is located above a niche. If a mobile robot is equipped with no such contact module, an upper portion of the mobile robot may directly collide with the obstacle 110. According to an exemplary embodiment, the obstruction-determining apparatus 200 is mounted on a mobile robot. Then, the contact module 210, instead of an upper portion of the mobile robot, collides with the obstacle 110, thereby preventing the mobile robot from crashing into the obstacle 110. Referring to FIGS. 2A and 2B, the contact module 210 may be formed as a ring or a circular plate. The contact module 210 may comprise a center portion and a plurality of sawtooth indentations 220 which are formed along the inner circumference of the contact module 210. When the contact module 210 collides with the obstacle 110, the contact module 210 rotates about a rotation axial member 260.

When the contact module 210 contacts the obstacle 110, the contact-operating module 230 moves linearly or rotates according to the movement of the contact module 210. The contact-operating module 230 comprises a detent which is attached to the rotation axial member 260, and engages the sawtooth indentations 220. The detent may be formed as a bar with an end tip that engages the sawtooth indentations 220. When the contact module 210 rotates clockwise upon contact with the obstacle 110, the detent may rotate along with the contact module 210 by engaging the sawtooth indentations 220 of the contact module 210. However, when the contact module 210 rotates counterclockwise, the detent does not engage the sawtooth indentations 220 of the contact module 210. Thus, the detent does not rotate along with the contact module 210.

The contact-operating module 230 may comprise a spring 240 which maintains the detent within a predetermined angle range. In detail, the spring 240 maintains the detent within a predetermined angle range. In addition, when the contact module 210 rotates clockwise, the spring 240 applies a reaction force to the detent, thus preventing the detent from rotating along with the contact module 210 and interfering with a forward movement of a mobile robot equipped with the obstruction-determining apparatus 200. Due to the detent, the mobile robot can be prevented from being completely stuck in a niche. On the other hand, when the contact module 210 rotates counterclockwise in an effort to escape from a niche, the detent can be maintained a predetermined distance apart from the sensing module 250 regardless of whether the detent moves in the opposite direction to the contact module 210.

The sensing module 250 determines whether a mobile robot equipped with the obstruction-determining apparatus 200 is in contact with the obstacle 110 based on the movement of the contact-operating module 230. The sensing module 250 may be a switch sensor which is turned on or off by the contact-operating module 230. In other words, referring to FIG. 2A, when the detent of the contact-operating module 230 contacts and presses the switch sensor while rotating clockwise, the switch sensor is turned on by the detent and determines that the contact module 210 is in contact with the obstacle 110. When the detent is detached from the switch sensor, the switch sensor is turned off and determines that the contact module 210 is separated from the obstacle 110. In this manner, the sensing module 250 can determine whether a mobile robot is obstructed in a niche.

The operation of the obstruction-determining apparatus 200 is as follows.

Assume that a niche exists in the heading of a mobile robot equipped with the obstruction-determining apparatus 200, and that the mobile robot is highly likely to be obstructed in the niche. If the mobile robot keeps traveling at the heading, the contact module 210 collides with an obstacle above the niche, and then begins to rotate clockwise. Once the contact module 210 starts rotating clockwise, the contact-operating module 230 comprising a bent that is formed as a bent bar rotates by engaging the sawtooth indentations 220 of the contact module 210. As a result of the rotation of the contact-operating module 230, the switch sensor begins to operate and notifies the mobile robot that the mobile robot is obstructed in the niche.

When it is determined that a mobile robot equipped with the obstruction-determining module 200 is obstructed in a niche, the mobile robot may move backward with the aid of a driving control module in order to escape from the niche. As a result of the backward movement of the mobile robot, the contact module 210 rotates counterclockwise. Then, the detent of the contact-operating module 230 is easily unlocked from the sawtooth indentations 220, and thus the switch sensor is turned off. Then, the mobile robot determines that it has escaped from the niche.

Figure 3:
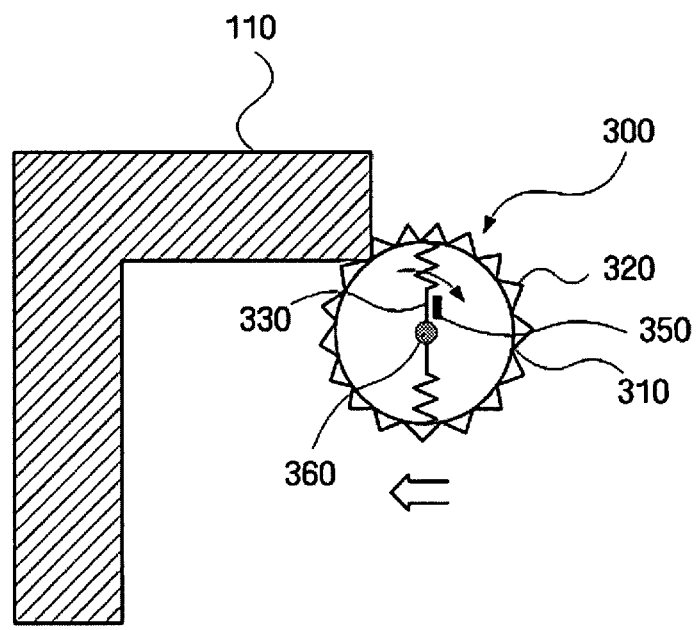
FIG. 3 is a diagram illustrating an obstruction-determining apparatus according to a further exemplary embodiment.

FIG. 3 is a diagram illustrating an obstruction-determining apparatus 300 according to another exemplary embodiment. Referring to FIG. 3, the obstruction-determining apparatus 300 includes a contact module 310, a contact-operating module 330, and a sensing module 350.

The contact module 310 comprises a ring. The contact module may also comprise a plurality of sawtooth indentations 320 which are formed along the outer circumference of the ring. The contact module 310 may comprise any type of protrusion other than the sawtooth indentations as long as the protrusions can prevent a mobile robot equipped with the obstruction-determining apparatus 300 from slipping away from an obstacle upon contact with the obstacle. The contact module 310 is ring-shaped with a hole in the center. The contact module 310 may rotate or move backward upon contact with an obstacle. Accordingly, it is possible to determine whether a mobile robot equipped with the obstruction-determining apparatus 300 is obstructed in a niche according to the type of movement of the contact module 310.

The contact-operating module 330 is fixed to a central member 360 and is supported by a plurality of elastic elements which are contractible. The contact-operating module 330 transmits a rotation or backward movement of the contact module 310 upon contact with an obstacle to the sensing module 350. In other words, when the contact module 310 collides with an obstacle, the contact-operating module 330 turns a sensor of the sensing module 350 on or off according to the movement of the contact module 310. Referring to FIG. 3, the contact-operating module 330 may comprise a plurality of elastic elements 330 which are fixed to the central member 360. The elastic elements 330 connect the contact module 310 to the central member 360 and maintain the contact module 310 a predetermined distance apart from the central member 360 when not in contact with any obstacle. The elastic elements 330 may be arranged at an interval of 180 or 90 degrees with respect to the central member 360. The elastic elements 330 may be formed of springs, rubber, or a contractible polymer. The elastic elements 330 maintain the connection between the contact module 310 and the central member 360 even when the contact module 310 collides with an obstacle, and is thus pushed away from the obstacle. In addition, the elastic elements 330 can move by contracting or expanding according to the movement of the contact module 310.

The sensing module 350 is mounted behind the contact-operating module 330 and is thus turned on or off according to the movement of the contact-operating module 330. The sensing module 350 determines whether a mobile robot equipped with the obstruction-determining module 300 is obstructed in a niche. The sensing module 350 may be a switch sensor which is turned on when being pressed down. When the contact module 310 rotates about an obstacle or moves backward from the obstacle upon collision with the obstacle, the contact-operating module 330 moves along with the contact module 310, thereby turning on the sensing module 350. In this case, the sensing module 350 determines that the mobile robot is obstructed in a niche.

Figure 4:
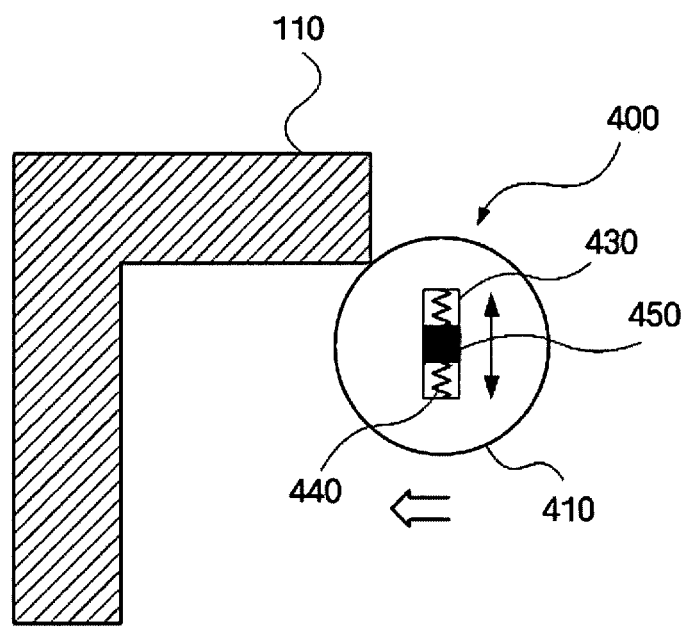
FIG. 4 is a diagram illustrating an obstruction-determining apparatus according to another exemplary embodiment.

FIG. 4 is a diagram illustrating an obstruction-determining apparatus 400 according to another exemplary embodiment. Referring to FIG. 4, the obstruction-determining apparatus 400 includes a contact module 410, a contact-operating module 440, and a sensing module 450.

The contact module 410 is formed as a circular plate and includes a groove 430 which is formed at the center of the contact module 410 and allows the contact module 410 to move vertically or laterally. The contact module 410 can move vertically or laterally upon collision with an obstacle which is located above a niche. According to an exemplary embodiment illustrated in FIG. 4, the contact module 410 can vertically move upon collision with an obstacle.

The contact-operating module 440 may linearly move according to the movement of the contact module 410. Referring to FIG. 4, the contact-operating module 440 provides a path of movement of the contact module 310 with the aid of the groove 430. Since a plurality of elastic elements 440 are formed in the groove 430, the contact-operating module 440 can maintain the contact module 410 at a predetermined location when the contact module 410 is not in contact with any obstacle. When the contact module 410 is lowered down upon collision with an obstacle, the elastic elements 440, which are located above the resulting contact module 410, contract so that the center of gravity can be lowered according to the movement of the contact module 410. Therefore, the elastic elements 440 can move along with the contact module 410. The elastic elements 440 support the contact module 410. The elastic elements 440 may be formed of springs, rubber, or a contractible polymer.

The sensing module 450 is formed in the groove 430, and serves as a switch sensor that detects the movement of the contact module 410. Since the elastic elements 440 contract upon contact with an obstacle, the sensing module 450 may be turned on when being pressed down by the movement of the elastic elements 440. Accordingly, the sensing module 450 may be a switch sensor which is turned on when being pressed down by the movement of the elastic elements 440.

Figure 5:
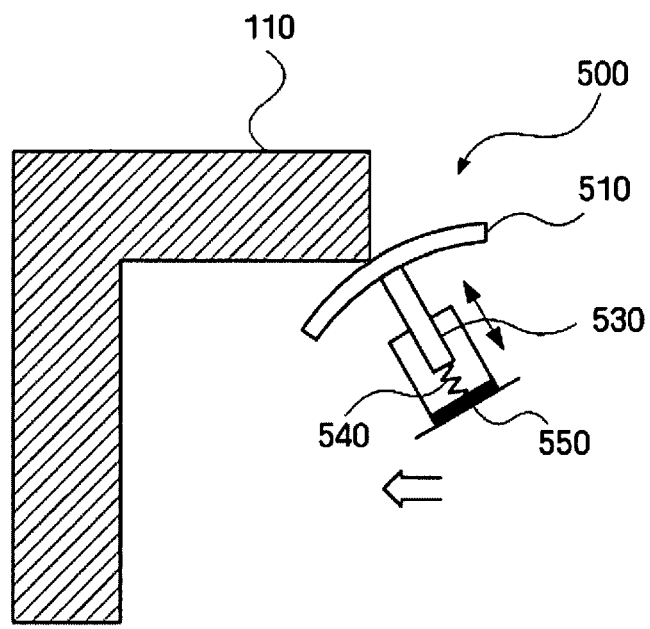
FIG. 5 is a diagram illustrating an obstruction-determining apparatus according to a further exemplary embodiment.

FIG. 5 is a diagram illustrating an obstruction-determining apparatus 500 according to another exemplary embodiment. Referring to FIG. 5, the obstruction-determining module 500 includes a contact module 510, a contact-operating module 530, and a sensing module 550.

The contact module 510 is formed as an umbrella-shaped plate that faces the direction between the heading of a mobile robot equipped with the obstruction-determining apparatus 500 and a vertical direction. Accordingly, the contact module 510 can enable the contact module 510 to slip away from an obstacle, which is located above a niche, upon collision with the obstacle. The contact module 510 may be lowered down by a predetermined amount by the contact-operating module 530 which supports the contact module 510 and induces movement of the contact module 510.

The contact-operating module 530 is attached to the contact module 510, and provides a path of movement of the contact module 510. The contact-operating module 530 may be linearly moved when being pushed by the contact module 510 upon collision with an obstacle. Referring to FIG. 5, the contact-operating module 530 provides the contact module 510 with a passage so that the contact module 510 can move along the passage when lowered upon collision with an obstacle. In addition, the contact-operating module 530 may transmit movement of the contact module 510 upon collision with an obstacle to the sensing module 550. The contact-operating module 530 may be formed as a straight bar and may support the contact module 510 with an elastic element. For example, the contact-operating module 530 may maintain the contact module 510 at a predetermined height with the aid of an elastic element such as a spring.

The sensing module 550 detects movement of the contact-operating module 530. When the contact module 510 moves upon contact with an obstacle, the contact-operating module 530 transmits the movement of the contact module 510 to the sensing module 550 by linearly moving along with the contact module 510. Then, the sensing module 550 detects the movement of the contact-operating module 530 and determines that the contact module 510 has collided with an obstacle. Since the obstruction-determining module 500 is mounted on a mobile robot, the sensing module 550 determines whether the mobile robot is obstructed in a niche by detecting movement of the contact module 510.

The sensing module 550 may be a switch sensor which is switched on or off according to the movement of the contact-operating module 530. When the contact module 510 is not in contact with an obstacle, the sensing module 550 is switched off even though the sensing module 550 is connected to the contact-operating module 530. However, when the contact module 510 moves upon contact with an obstacle and thus the contact-operating module 530 is lowered, the sensing module 550 is switched on. Once the sensing module 550 is switched on, a driving control module of a mobile robot equipped with the obstruction-determining module 500 stops moving forward and begins to move backward.

Figure 6:
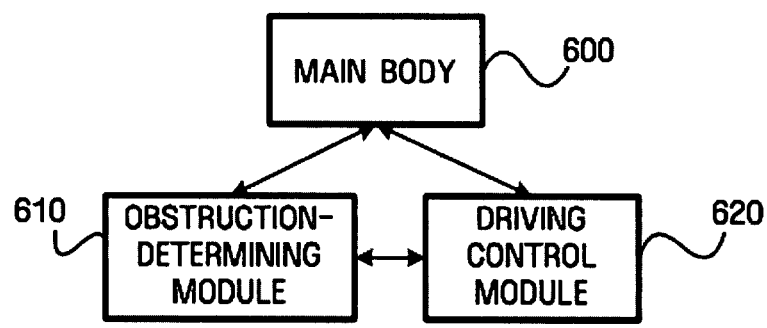
FIG. 6 is a block diagram of a mobile robot equipped with an obstruction-determining apparatus according to an exemplary embodiment.

FIG. 6 is a block diagram of a mobile robot equipped with an obstruction-determining apparatus according to another exemplary embodiment. Referring to FIG. 6, the mobile robot includes a main body 600, an obstruction-determining module 610, and a driving control module 620.

The main body 600 provides an empty space so that the driving control module 620, the obstruction-determining module 610, and a function-performing module (not shown) that performs functions of the mobile robot can be installed in the empty space. The main body 600 may be formed in various shapes. For example, referring to FIG. 1, the main body 600 may be formed as a wheel 130 or a flat plate with an endless track.

The obstruction-determining module 610 determines whether the mobile robot is obstructed in a niche during the traveling of the mobile robot. The obstruction-determining module may be any one of the obstruction-determining apparatuses 100, 200, 300, 400, and 500 and includes a contact module, a contact-operating module, and a sensing module. The obstruction-determining apparatuses 100, 200, 300, 400, and 500 and the contact module, the contact-operating module, and the sensing module have already been described in detail, and thus detailed descriptions thereof will be skipped.

The obstruction-determining module 610 determines whether the mobile robot is obstructed in a niche. If it is determined that the mobile robot is obstructed in a niche, the obstruction-determining module 610 prevents the mobile robot from being obstructed further into the niche so that the mobile robot can easily escape from the niche with the aid of the driving-control module 620. The escape of the mobile robot from a niche with the aid of the obstruction-determining module 610 will hereinafter be described in detail. The obstruction-determining module 610 is the same as an obstruction-determining apparatus. According to an exemplary embodiment, the obstruction-determining module 610 is provided as an element of the mobile robot. However, the obstruction-determining module 610 is an independent device and is thus referred to as an obstruction-determining apparatus.

According to an exemplary embodiment, once the mobile robot is determined to be obstructed in a niche, the mobile robot must escape from the niche. The mobile robot can escape from a niche by moving backward from the niche. If the mobile robot is completely stuck in the niche, the mobile robot may not be able to escape from the niche using its own driving power. For this, the obstruction-determining module 61 performs the following operations.

Referring to FIG. 2A, the detent 230 of the obstruction-determining apparatus 200 prevents a mobile robot from being jamming further into a niche by engaging the sawtooth indentations 220. Then, a switch of the sensing module 250 is turned on, thereby stopping the mobile robot from moving. Referring to FIG. 2B, the obstruction-determining apparatus 200 moves in the opposite direction to the direction in which the mobile robot is obstructed in the niche. Then, the detent 230 is easily unlocked from the sawtooth indentations 220, thereby facilitating the escape of the mobile robot.

Referring to FIG. 3, the obstruction-determining apparatus 300 includes the contact module 310 that is formed as a ring and the elastic elements 330 which support the contact module 310. Thus, when a mobile robot equipped with the obstruction-determining apparatus 300 is obstructed in a niche, the obstruction-determining apparatus 300 can rotate while lowering down the contact module 310. Accordingly, the contact module 310 is rotated and pushed away from the niche upon collision with an obstacle above the niche, instead of being stuck in the niche. Thereafter, the mobile robot begins to move in the opposite direction to the direction in which the mobile robot is obstructed in the niche. Then, the contact module 310 returns to its original location with the aid of the elastic elements 330, thereby enabling the mobile robot to easily escape from the niche.

Referring to FIG. 4, the contact module 410 is formed as a circular plate. Thus, when a mobile robot equipped with the obstruction-determining apparatus 400 is obstructed in a niche, the contact module 410 is lowered. Since the surface of the contact module 410 has a smooth curvature profile, the contact area between the contact module 410 and an obstacle and friction generated upon contact between the contact module 410 and the obstacle can be reduced, thereby moving the mobile robot backward with less power. Accordingly, the mobile robot can easily escape from the niche without causing resistance to the contact module 410.

Referring to FIG. 5, when a mobile robot equipped with the obstruction-determining apparatus 500 is obstructed in a niche under an obstacle, the contact module 510 slides down the obstacle because the contact module 510 has a curved profile. Thus, when the mobile robot stops moving and begins to move backward, the mobile robot can easily escape from the niche. Friction is generated between the obstacle and the contact module 510 due to normal stress. However, since the contact module 510 has a smooth surface and thus has a low friction coefficient, the force of friction generated upon collision between the contact module 510 and the obstacle is weak. Accordingly, the mobile robot can easily escape from the niche simply by moving backward without any resistance.

As described above, the obstruction-determining apparatuses 200, 300, 400, and 500 respectively illustrated in FIGS. 2A through 5 can determine whether a mobile robot is obstructed in a niche and can enable a mobile robot to easily escape from a niche if it is determined that the mobile robot is obstructed in the niche. In other words, the obstruction-determining apparatuses 200, 300, 400, and 500 prevent a mobile robot from being completely stuck in a niche.

Referring to FIG. 6, the driving control module 620 controls the movement of the mobile robot. The driving control module 620 includes a driving unit such as a motor or an engine which generates driving power and a wheel or an endless track which rotates by being supplied with the driving power. When the mobile robot is determined to be obstructed in a niche, the driving control module 620 controls the mobile robot to escape from the niche. In detail, when the mobile robot is determined to be obstructed in a niche, the driving control module 620 stops the mobile robot from traveling in the heading direction of the mobile robot and controls the mobile robot to move in the opposite direction to the heading direction of the mobile robot. If the obstruction-determining module 610 simply determines whether the mobile robot is obstructed in a niche, the mobile robot may be obstructed further in the niche due to an inertial force. However, according to an exemplary embodiment, the obstruction-determining module 610 can determine whether the mobile robot is obstructed in a niche, and has a structure that helps the mobile robot to easily escape from a niche if the mobile robot is determined to be obstructed in the niche. Thus, the mobile robot can easily escape from the niche simply with the aid of the driving control module 620.

Figure 7:
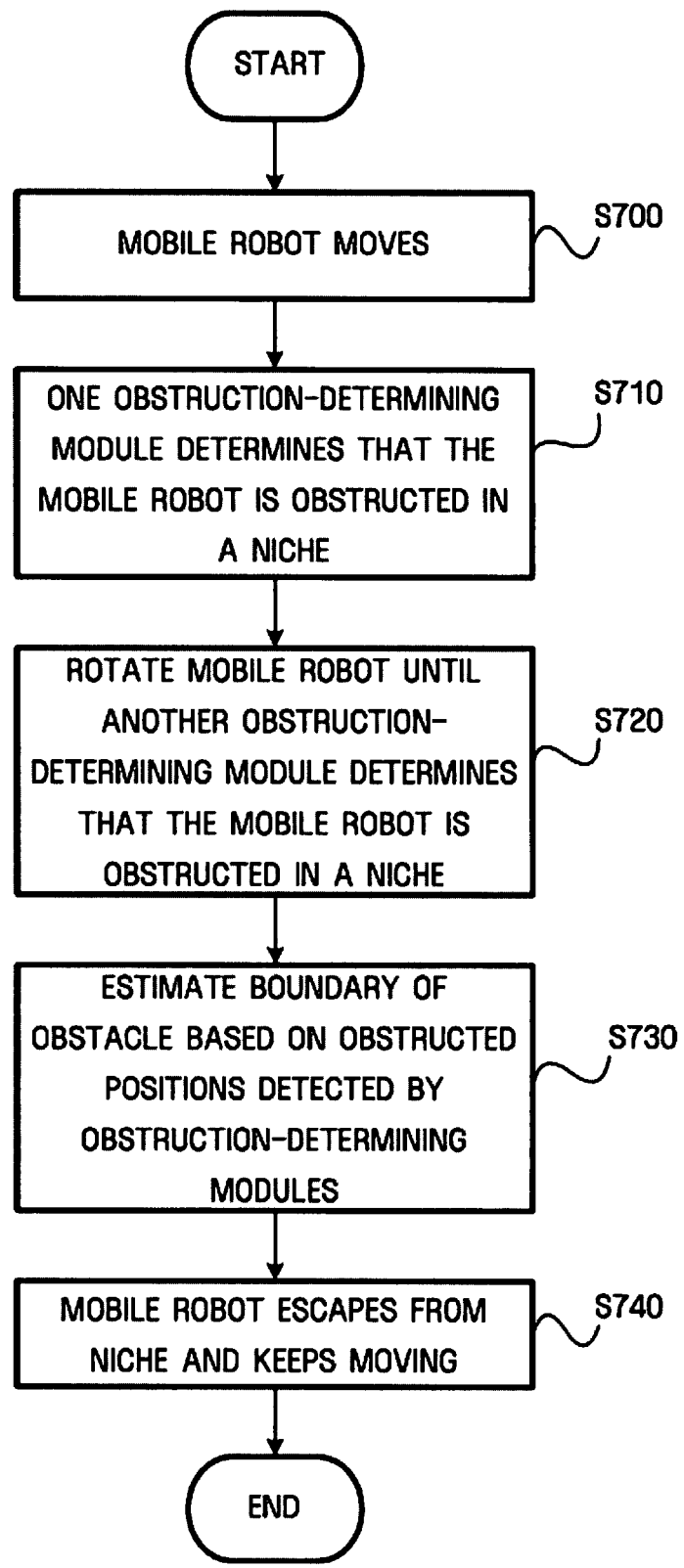
FIG. 7 is a flowchart illustrating a boundary-estimation method using obstruction determination according to an exemplary embodiment.
Figure 8A:
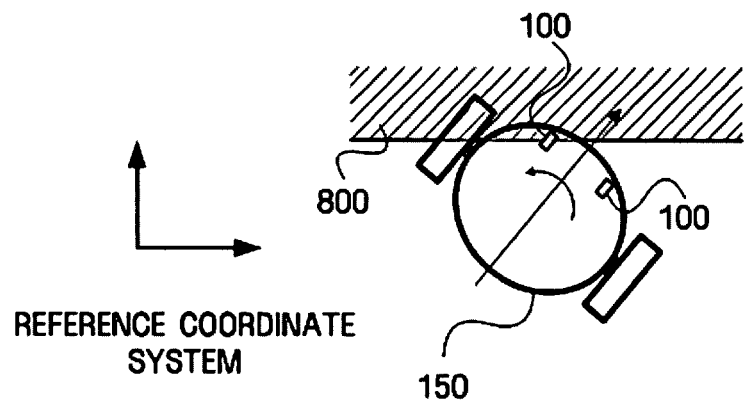
FIGS. 8A and 8B are diagrams for explaining the movement of a mobile robot using the boundary-estimation method illustrated in FIG. 7.
Figure 8B:
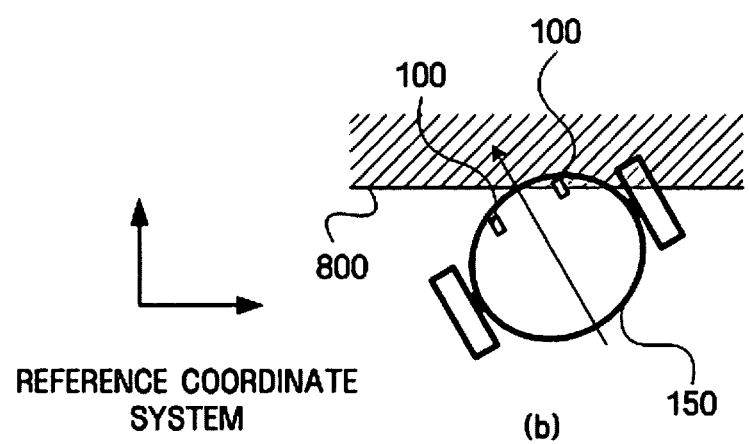

FIG. 7 is a flowchart illustrating a boundary-estimation method using obstruction determination according to an exemplary embodiment, and FIGS. 8A and 8B are diagrams for explaining the movement of a mobile robot using the boundary-estimation method illustrated in FIG. 7.

Referring to FIG. 7, in operation S700, a mobile robot travels. In operation S710, at least one of a plurality of obstruction-determining modules of the mobile robot determines that the mobile robot is obstructed in a niche. In operation S720, the mobile robot is rotated until the other obstruction-determining module determines that the mobile robot is obstructed in the niche. In operation S730, the boundaries of an obstacle are estimated based on a plurality of obstructed positions respectively detected by the obstruction-determining modules. In operation S740, the mobile robot escapes from the niche, and is driven according to the estimated boundaries.

In detail, in operation S700, the mobile robot travels in a predetermined indoor space. The mobile robot may include a plurality of obstruction-determining modules which are mounted on the front to the mobile robot. For example, the mobile robot may include two obstruction-determining units, as illustrated in FIGS. 8A and 8B.

In operation S710, when the mobile robot is obstructed in a niche while traveling, one of the two obstruction-determining modules of the mobile robot determines first that the mobile robot is obstructed in the niche. In detail, when a contact module of one of the two obstruction-determining modules of the mobile robot collides with an obstacle, a contact-operating module moves and thus turns on a switch sensor, thereby determining that the mobile robot is obstructed in the niche.

In operation S720, if one of the two obstruction-determining modules of the mobile robot determines that the mobile robot is determined to be obstructed in the niche, the mobile robot is rotated until the other obstruction-determining module also determines that the mobile robot is obstructed in the niche. Referring to FIGS. 8A and 8B, if a left obstruction-determining module 100 determines that a mobile robot is obstructed in a niche, the mobile robot is rotated until a right obstruction-determining module 100 also determines that the mobile robot is obstructed in the niche. If the niche in which the mobile robot is obstructed forms a uniform line, it is difficult to estimate a boundary 800 of the niche. For this, more than two obstruction-determining modules may be provided to the mobile robot, thereby precisely estimating the boundary 800 of the niche.

In short, if one of the two obstruction-determining modules 100 determines that the mobile robot is obstructed in a niche, the mobile robot is rotated until the other obstruction-determining modules 100 also determines that the mobile robot is obstructed in the niche. A first obstructed position of the mobile robot can be calculated using a coordinate system of the mobile robot, and then converted to a reference coordinate system. Likewise, a second obstructed position of the mobile robot can calculated using the coordinate system of the mobile robot, and then converted to the reference coordinate system. Thereafter, the boundary 800 of the niche can be estimated based on the first and second obstructed positions by using the reference coordinate system.

Once the boundary 800 is estimated, the mobile robot escapes from the niche and keeps traveling. In order to escape from the niche, the mobile robot must move backward by a predetermined distance with the aid of a driving control module of the mobile robot. In order to travel in parallel with the boundary 800, the mobile robot is rotated so that the heading angle of the mobile robot coincides with the direction of the boundary 800. Thereafter, the mobile robot is driven to move forward. Then, the mobile robot can keep traveling while avoiding the niche.

In addition to the above-described exemplary embodiments, exemplary embodiments can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, code/instructions may include functional programs and code segments.

The computer readable code/instructions can be recorded/transferred in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), hardware storage devices (e.g., read only memory media, random access memory media, flash memories, etc.) and storage/transmission media such as carrier waves transmitting signals, which may include computer readable code/instructions, data files, data structures, etc. Examples of storage/transmission media may include wired and/or wireless transmission media. The medium/media may also be a distributed network, so that the computer readable code/instructions are stored/transferred and executed in a distributed fashion. The computer readable code/instructions may be executed by one or more processors. The computer readable code/instructions may also be executed and/or embodied in at least one application specific integrated circuit (ASIC) or Field Programmable Gate Array (FPGA).

In addition, one or more software modules or one or more hardware modules may be configured in order to perform the operations of the above-described exemplary embodiments.

The term "module", when used in connection with execution of code/instructions, may denote, but is not limited to, a software component, a hardware component, a plurality of software components, a plurality of hardware components, a combination of a software component and a hardware component, a combination of a plurality of software components and a hardware component, a combination of a software component and a plurality of hardware components, or a combination of a plurality of software components and a plurality of hardware components, which performs certain tasks. A module may advantageously be configured to reside on the addressable storage medium/media and configured to execute on one or more processors. Thus, a module may include, by way of example, components, such as software components, application specific software components, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processor (e.g. central processing unit (CPU)) provided in a device. In addition, examples of a hardware components include an application specific integrated circuit (ASIC) and Field Programmable Gate Array (FPGA). As indicated above, a module can also denote a combination of a software component(s) and a hardware component(s). These hardware components may also be one or more processors.

The computer readable code/instructions and computer readable medium/media may be those specially designed and constructed for the purposes of exemplary embodiments, or they may be of the kind well-known and available to those skilled in the art of computer hardware and/or computer software.

As described above, exemplary embodiments have the following advantages.

First, it is possible to prevent a mobile robot from being completely stuck in a niche by realizing a mechanical structure that helps the mobile robot not to be obstructed in a niche.

Second, it is possible to prevent the situation when a mobile robot is obstructed in a niche and thus cannot travel any further from occurring by mounting on the mobile robot an obstruction-determining apparatus which can prevent a mobile robot from being completely stuck in a niche and help the mobile robot to easily escape from a niche.

Third, it is possible to enable a mobile robot to travel while avoiding an obstacle with a niche by estimating the boundaries of an obstacle using more than one obstruction-determining apparatus.

Although a few exemplary embodiments have been shown and described, it would be appreciated by those skilled in the art that changes may be made in these exemplary embodiments, the scope of which is defined in the claims and their equivalents.

What is claimed is:

1. An obstruction-determining apparatus which is mounted on a mobile robot and determines whether the mobile robot is obstructed, the obstruction-determining apparatus comprising:
a contact module which collides with an obstacle above the mobile robot;
a contact-operating module which rotates or moves vertically as a result of the collision between the contact module and the obstacle; and
a sensing module which detects the rotation or the vertical movement of the contact-operating module and determines whether the mobile robot is obstructed in a niche using the rotation or the vertical movement of the contact-operating module,
wherein the contact module is located at an upper front portion of the mobile robot on an outside surface of the mobile robot.

2. The obstruction-determining apparatus of claim 1, wherein the contact module is formed as a circular plate or a ring that rotates upon collision with the obstacle and comprises a plurality of sawtooth indentations that are formed along an inner circumference of the contact module.

3. The obstruction-determining apparatus of claim 2, wherein the contact-operating module comprises a detent which interferes with rotation of the contact module upon collision with the obstacle by engaging the sawtooth indentations.

4. The obstruction-determining apparatus of claim 3, wherein:
when the mobile robot is obstructed in the niche, the sawtooth indentations are engaged by the detent, and thus prevent the mobile robot from being obstructed further in the niche; and
when the mobile robot moves to escape from the niche, the sawtooth indentations are unlocked from the detent, instead of being engaged by the detent.

5. The obstruction-determining apparatus of claim 3, wherein the contact-operating module further comprises a spring which prevents excessive rotation of the detent and maintains the detent to be within a predetermined angle range.

6. The obstruction-determining apparatus of claim 3, wherein the sensing module comprises a switch sensor which is turned on when being pressed down by rotation of the detent, and determines whether the mobile robot is obstructed in the niche.

7. The obstruction-determining apparatus of claim 1, wherein the contact module comprises a ring with a plurality of sawtooth indentations or protrusions formed along an outer circumference thereof.

8. The obstruction-determining apparatus of claim 7, wherein the contact-operating module comprises an elastic element which connects the ring to a central member.

9. The obstruction-determining apparatus of claim 8, wherein the sensing module comprises a switch sensor which is turned on when being pressed down by movement of the elastic element and determines whether the mobile robot is obstructed in the niche.

10. The obstruction-determining apparatus of claim 1, wherein the contact module comprises a circular plate with a groove in the middle thereof, the groove allowing the contact module to move vertically or laterally.

11. The obstruction-determining apparatus of claim 10, wherein the contact-operating module comprises an elastic element which is formed in the groove and moves by contraction of the elastic element according to vertical or lateral movement of the circular plate.

12. The obstruction-determining apparatus of claim 11, wherein the sensing module comprises a switch sensor which is turned on when being pressed down by contraction of the elastic element, and determines whether the mobile robot is obstructed in the niche.

13. The obstruction-determining apparatus of claim 1, wherein the contact module comprises a protruding plate which is pushed away upon collision with the obstacle.

14. The obstruction-determining apparatus of claim 13, wherein the contact-operating module comprises a stick which is attached to the protruding plate and guides the protruding plate to move linearly.

15. The obstruction-determining apparatus of claim 14, wherein the sensing module comprises a switch sensor which is turned on when being pressed down by linear movement of the stick, and wherein the switch sensor determines whether the mobile robot is obstructed in the niche.

16. A mobile robot comprising:
a main body;
an obstruction-determining module which determines whether the main body is obstructed in a niche; and
a driving control module which controls movement of the main body if the main body is determined to be obstructed in a niche,
wherein the obstruction-determining module collides with an obstacle above the mobile robot, rotates or moves vertically as a result of the collision between the obstruction-determining module and the obstacle, and determines whether the mobile robot is obstructed in a niche using the rotation or the vertical movement of the contact-operation module, and
wherein the obstruction-determining module is located at an upper front portion of the main body.

17. The mobile robot of claim 16, wherein the obstruction-determining module comprises:
a contact module which collides with an obstacle above the mobile robot;
a contact-operating module which rotates or moves linearly as a result of the collision between the contact module and the obstacle; and
a sensing module which detects the rotation or the linear movement of the contact-operating module, and determines whether the mobile robot is obstructed in a niche.

18. A boundary-estimation method using an obstruction-determining modules comprising:
allowing a first obstruction-determining module of a plurality of obstruction-determining modules to determine that a mobile robot is obstructed in a niche, the obstruction-determining modules being mounted on top of the mobile robot and on an outside surface of the mobile robot;
rotating the mobile robot until a second obstruction-determining module of the obstruction-determining modules also determines that the mobile robot is obstructed in the niche; and
estimating a boundary of the obstacle based on a plurality of obstructed positions of the mobile robot respectively detected by the obstruction-determining modules.

19. The boundary-estimation method of claim 18, further comprising allowing the mobile robot to move along the estimated boundary.

20. At least one computer readable medium storing computer readable instructions that control at least one processor to implement the method of claim 18.

21. An obstruction-determining apparatus which is mounted on a mobile robot and determines whether the mobile robot is obstructed, the obstruction-determining apparatus comprising:
a contact-operating module to rotate or to move vertically as a result of a collision above the mobile robot between the obstruction-determining apparatus and the obstacle; and
a sensing module to detect the rotation or the vertical movement of the obstruction-determining apparatus and to determine whether the mobile robot is obstructed in a niche using the rotation or the vertical movement of the contact-operating module,
wherein the contact-operating module is located at an upper front portion of the mobile robot on an outside surface of the mobile robot.

22. The obstruction-determining apparatus of claim 21, further comprising a contact module which collides with the obstacle above the mobile robot.

* * * * *